Oct. 14, 1969

H. L. BURNS 3,472,225

FLUID INVERTER

Filed May 31, 1966

INVENTOR.
HENRY L. BURNS
BY
R. R. Schermerhorn
Attorney

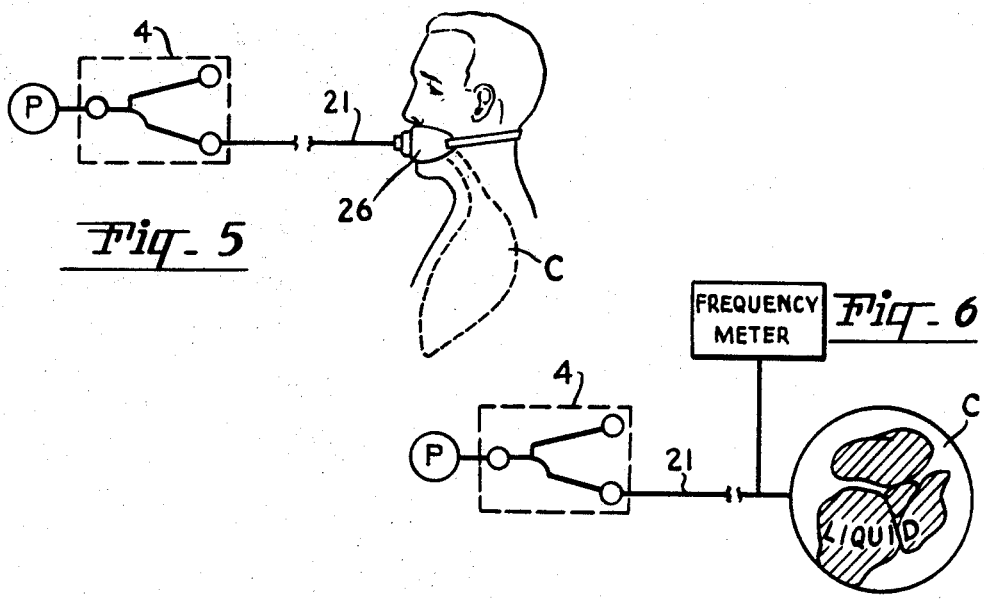
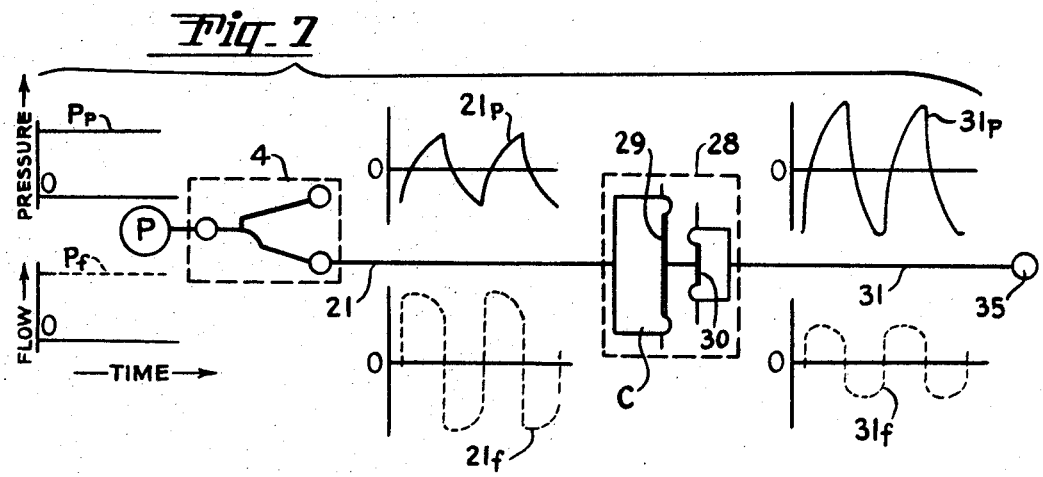
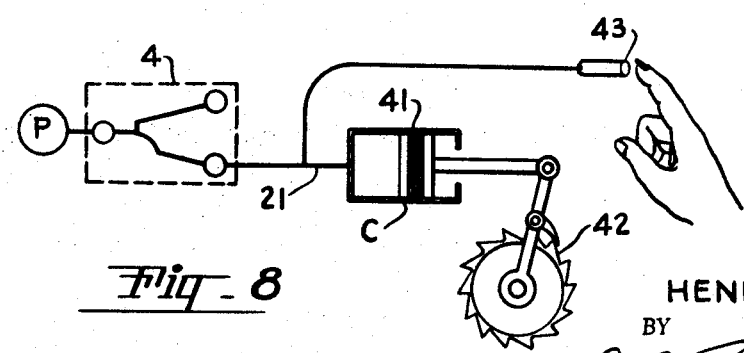

United States Patent Office 3,472,225
Patented Oct. 14, 1969

3,472,225
FLUID INVERTER
Henry L. Burns, Beaverton, Wash., assignor, by mesne assignments, to Cavitron Corporation, Long Island City, N.Y., a corporation of New York
Continuation-in-part of application Ser. No. 324,382, Nov. 18, 1963. This application May 31, 1966, Ser. No. 554,011
Int. Cl. A62b 7/10; A61m 15/00; F15c 1/08
U.S. Cl. 128—145.6                                9 Claims

ABSTRACT OF THE DISCLOSURE

A capacitance cooperative cycling valve having no moving parts. An inlet nozzle constitutes the only functional source of fluid to the valve. A pair of diverging branch passageways extend from the region of said inlet nozzle, one being a capacitance supplying passageway and the other being an exhaust passageway. The stream from the nozzle is biased into the capacitance supplying passageway by a continuous curved divergence of the outside wall from the nozzle while the outside wall of the exhaust passageway has an offset divergence from the nozzle. When the capacitance is filled the flow reverses in the capacitance supplying passageway and the capacitance and nozzle stream both discharge through the exhaust passageway.

---

This application is a continuation-in-part of Ser. No. 324,382 filed Nov. 18, 1963, titled Cycling Valve, now Patent No. 3,280,832.

This invention relates to a pure fluid device which is capable of converting a steady and continuous unidirectional fluid flow into an alternating forward and reverse fluid flow with a minimum of pressure and energy loss.

It is the primary object of the invention to provide a fluid bow and pressure inverter having no moving parts other than the fluid flowing through it.

More specific objects of the invention are to provide a cycling valve which is functionally equivalent to the valve disclosed in said parent application Ser. No. 324,-382 but which is more simple and inexpensive to manufacture and to provide a reliable emergency respirator whose pressure conservation efficiency is great enough to allow use of a simple direct connected, positive displacement blower as the gas supply.

In addition to providing the inhalation-exhalation function ordinarily provided by diaphragms, poppets, and mechanical parts of the usual automatic respirator, this invention also provides a valving action analogous to the two way valves used to control pistons and other intermittent devices used in conventional pneumatic and hydraulic systems.

The device of the invention is also similar in function to the DC to AC inverter used in electronic systems. Fluid control devices have become of increasing interest since the introduction of pure fluid amplifiers to perform computing and control functions analogous to electronic systems. Numerous associated "no gain" devices such as fluid resistors, capacitors, diodes, delay lines, etc., have been developed. A general discussion of fluid amplifiers and related device construction can be found in the literature and recently issued patents. The present invention is a "no gain" pure fluid device which will allow application of some of the features of AC electronics to these fluid systems.

In its construction, the cycling valve of the invention utilizes a fluid flow boundary layer phenomenon described by Coanda in U.S. Patent No. 2,052,869 except that instead of developing a predominantly high velocity turbulent action as in Coanda, the present invention strives to maintain a laminar flow pattern over all critical surfaces. In order to encourage laminar flow with dimensions and velocities larger than normally associated with laminar flow, the present invention utilizes a curved flow pattern within the design parameters given in the Chemical Engineer's Handbook, edited by J. H. Perry, page 384, 3rd edition, 1950, published by McGraw-Hill Book Co., Inc., New York, N.Y., wherein it is shown that the critical velocity above which a given fluid in a given apparatus will move from laminar to turbulent flow can be increased substantially by directing the flow in a curved path. In contrast to the usual pure fluid valve design which depends on an abrupt power stream side wall divergence and jet stream separation bubble formation for proper operation, the present invention encourages continuous power stream side wall attachment in the pressure build-up mode.

In all applications of the present invention, an additional element functioning as a capacitance is required. This capacitance can take any of several forms without altering the basic inverter function or design of the invention. For example, in the resuscitator application the lungs become the capacitance element. In the mechanical application the capacitance might be a piston or diaphragm or a rigid tank. In the electronic analogy the capacitance could be a fixed volume, or a moving diaphragm also acting as a transformer. A special operational mode of the invention can be obtained by inserting a fluid leak in the capacitance connection and control of the leak can be made to start and stop the alternating action.

Use of the AC analogy in fluid circuits is not new, but because of recent sophistication of fluid control systems, the concept is now under intensive development especially in hydraulic systems. Possible advantages of an alternating fluid flow system may be cited as follows:

(1) Within one system different fluids, even gases and liquids, can be used with control signals and power transferred across a fluid isolation transformer such as a piston or diaphragm.

(2) Since fluid circulation is eliminated the weight and cost of return lines are eliminated and environmental stress such as severe temperature will not be conducted throughout the system.

(3) Conversion of pressure to flow by use of step-up or step-down fluid transformers in the form of large and small diaphragm sets.

(4) Sychronized motion between an input device and an output device.

(5) Possible to apply an alternating flow carrier control signal to a conventional direct flow fluid system.

(6) Possible application to fluid step-servo systems.

The various functions and advantages described above are also attained in the cycling valve of my parent application, Ser. No. 324,382. In that valve the continuous flow jet is continuously biased toward the capacitance connected branch of the fluid passage on one side of a divider in front of the jet nozzle or orifice by a biasing jet supplied from said capacitance branch. In the present valve the biasing means comprises simply an uninterrupted airfoil surface adjacent the inlet stream on the capacitance branch side which utilizes the Coanda or boundary layer lock-on effect and no biasing jet is employed. The operating characteristics of the valve may be changed by varying the contour of the air foil surface.

The invention will be better understood and additional objects and advantages will become apparent from the following description of certain preferred embodiments illustrated in the accompanying drawings. Various changes may be made, however, in the details of construction and arrangement of parts and certain features may be used without others. All such modifications within the scope of the appended claims are included in the invention.

In the drawings:

FIGURE 5 is a diagrammatic view showing the use of the cycling valve in an emergency respirator;

FIGURE 6 is a diagrammatic view illustrating use of the valve for measuring volume or capacitance;

FIGURE 7 is a diagrammatic view with graphs appended showing use of the valve and an inverter in one function of the analogy to an electronic inverter; and FIGURE 8 illustrates the use of the cycling valve to deliver a mechanical output.

Figure 1:
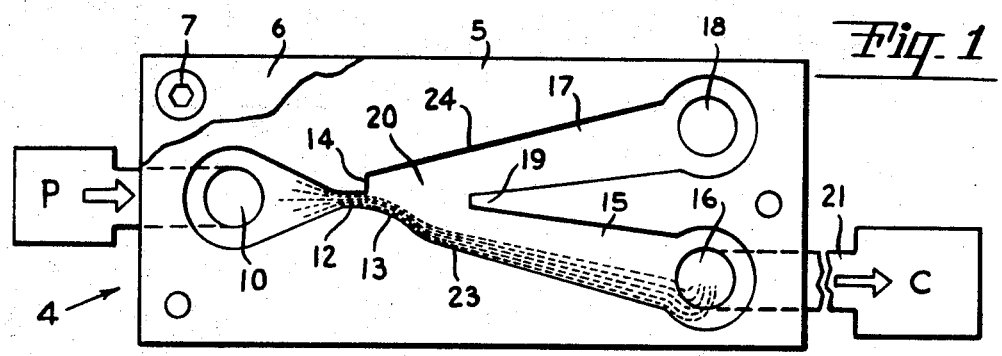
FIGURE 1 is a plan view, with parts broken away, of a cycling valve embodying the principles of the invention and including diagrammatically a source of fluid pressure and a fluid capacitance, showing the flow pattern when the valve is operating in the capacitance filling mode.
Figure 2:
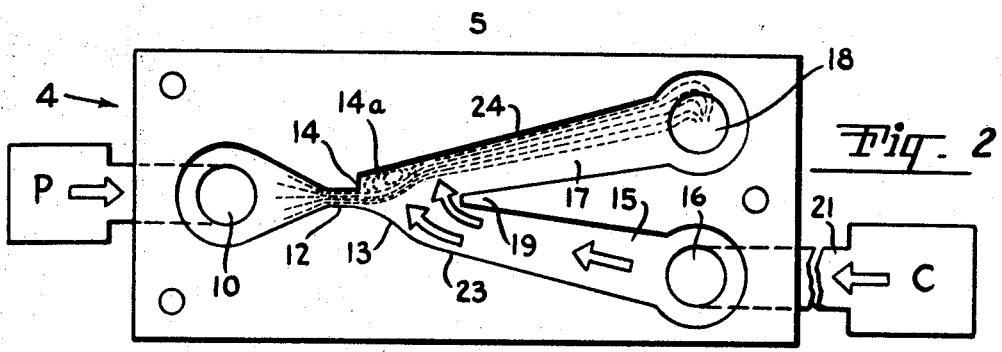
FIGURE 2 is a similar view showing the flow pattern in the exhaust mode of operation.

FIGURES 1 and 2 show the construction of the present cycling valve 4 with the fluid supply and capacitance illustrated diagrammatically. FIGURE 1 shows the flow pattern when the cycling valve is operating in the filling mode—that is, when the fluid is flowing into the capacitance and pressure in the capacitance is increasing. FIGURE 2 shows flow pattern in the exhaust mode when fluid flow has reversed and capacitance pressure is falling.

The cycling valve consists entirely of a special arrangement of continuously open passageways. These passageways are rectangular in cross section with side walls which are both angular and curved in the plane of the view as shown in FIGURE 1. The passageways may be formed as grooves in a plate covered by another plate, or as a box structure with top, bottom and side walls formed to the desired shape, or as an open template sandwiched between two plates.

As illustrated, the passageways are formed as grooves in a bottom plate 5 which is covered by a top plate 6, the two plates being secured together by suitable means such as screws or bolts 7. The valve is supplied with a steady, continuous flow of fluid from a source of pressure P which may be an air pump. This fluid is cyclically delivered to a dead end capacitance C. The capacitance may have a fixed or variable volume and it may be subject to leakage.

Fluid enters the cycling valve at inlet connection 10 and passes through a nozzle constriction 12. Downstream from the nozzle 12 one side wall 13 diverges in a smooth, curved pattern while the other side wall 14 is offset and departs abruptly. Except for this difference in nozzle divergence at 13 and 14 all side wall patterns are symmetrical. Farther downstream the fluid conducting groove separates into two passageways, passageway 15 leading to capacitance connection 16 and passageway 17 leading to the exhaust port or connection 18. Between these passageways 15 and 17 is a divider 19 located on the nozzle center line, and between this divider and the nozzle divergent walls is an interaction chamber 20. Beyond capacitance connection 16 is a tube or hose 21 leading to capacitance C. As stated previously, the capacitance may take any of several forms which are functionally dead end cavities capable of absorbing and releasing fluid flow and pressure.

Fluid flow of the main power stream entering the nozzle is shown as dotted lines arranged as actually observed stream lines through the cycling valve. Flow direction into the capacitance C is shown by arrows in FIGURE 1 and reverse flow from the capacitance is shown by arrows in FIGURE 2. In the capacitance filling mode, FIGURE 1 shows fluid entering the nozzle and continuing in an unbroken essentially laminar fashion onto curved divergence 13 thence along the outside wall 23 of the capacitance branch 15 and into connection 16.

The exact profile of curvature of wall 13 and its divergence from the nozzle will determine the performance characteristics of the cycling valve. The radius of curvature is preferably from six to ten times the width of minimum nozzle opening—this being in the range of channel to curvature proportions found best in inhibiting turbulence. If essentially laminar flow is maintained over nozzle divergence 13, then the vortex or eddy-current action necessary to create a separation bubble is precluded and the power stream lock-on is tenacious and cannot be dislodged until a considerable portion of the power stream's pressure and flow has been transferred to the capacitance branch 15.

When the capacitance has absorbed its maximum volume, and pressure transfer from the inlet to capacitance connection 16 is at its maximum, the power stream must leave the capacitance branch 15 and enter the exhaust branch 17 allowing fluid volume and pressure absorbed by the capacitance to reverse direction and reenter the cycling valve via the capacitance branch 15 as shown in FIGURE 2. Curved divergence 13 now becomes a deflecting surface directing the capacitance reverse flow against the power stream further enhancing the overall crowding of the power stream into the exhaust branch 17 as the capacitance reverse flow joins the power stream on its way to the exhaust port 18.

In this phase the power stream attaches to and locks onto side wall 24 of the exhaust branch 17 but the abrupt nozzle divergence of side wall 14 on the exhaust branch side allows a separation bubble to form at 14a thereby reducing the maximum pressure transfer available from the inlet 10 to exhaust 18. In effect the relatively strong power stream attachment to curved divergence 13 as transferred to capacitance branch wall 23 compared to the weaker attachment to exhaust wall 24 produces a biasing effect which in the absence or completion of capacitance reverse flow will always return the power stream to the capacitance branch 15 thereby completing the cycle with the start of a new filling mode.

For the exhaust mode to be distinct and the flow-pressure cycle well defined, it is necessary that exhaust side wall 24 be close enough to the power stream to allow boundary layer lock-on of the same general magnitude as that occurring on capacitance side wall 23, the only difference being that created by the tenacity of curved divergence 13 and the weakness of abrupt divergence 14 and its associated separation bubble. In fact downstream, beyond the point where divergence 13 blends with the capacitance branch wall 23, the exhaust and capacitance branches are identical and symmetrical about the nozzle center line.

Figure 3:
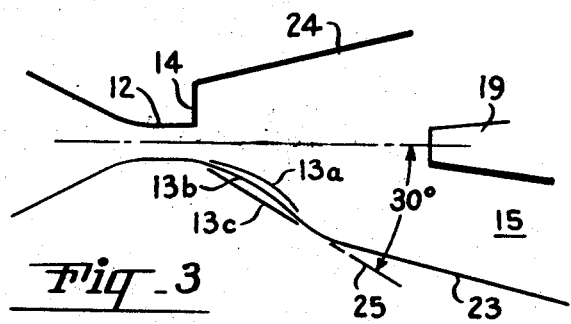
FIGURE 3 is an enlarged fragmentary diagrammatic illustration showing three possible variations in profile of the airfoil biasing surface of the valve.

FIGURE 3 shows three possible variations in profile of curved divergence 13 of FIGURE 1 and are identified as 13a, 13b and 13c. All three curves blend with side wall 23 at a common point with a chord line 25 diverging at approximately 30° from the nozzle axis. Divergence 13c coincides with this chord line and for this illustration represents a curve of infinitely large radius which would not be used in practice. Divergence 13a is tangent with the nozzle wall and provides a perfectly smooth transition from nozzle to curved divergence. Curve 13b represents an intermediate situation between curves 13a and 13c and accordingly will exhibit some slight break between nozzle and curved divergence wall.

The side wall surfaces defined by curves 13a, 13b and 13c may be described as airfoil surfaces because of the strong boundary layer lock-on effects as compared to the abrupt divergence of the opposite side wall 24 at 14.

Figure 4:
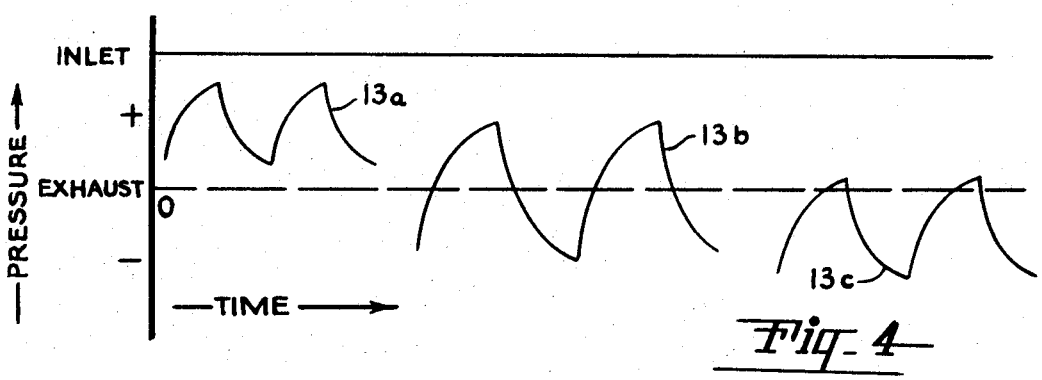
FIGURE 4 is a graph showing typical capacitance pressure versus time characteristics for the different profile variations shown in FIGURE 3.

FIGURE 4 shows typical capacitance pressure versus time characteristics for each profile that would be produced by a cycling valve and capacitance system wherein the only change made is in details of the curved divergence as shown in FIGURE 3. A uniform inlet pressure at an elevated level and a uniform exhaust pressure at a lower and reference level are shown with the cycling valve capacitance pressure indicated positive above the exhaust pressure and negative below the exhaust pressure. Time pressure characteristic for 13a shows an alternating pressure cycle between 20% and 80% of inlet pressure. This unusually high positive pressure recovery is a primary feature of the present invention made possible by the indicated refinement in nozzle divergence on one side of the nozzle. It is to be noted that biasing toward the capacitance filling mode is too strong for the capacitance to vent completely to the exhaust pressure level.

Time pressure characteristic 13b shows a typical pressure cycle for a divergence curve set to give capacitance pressure in both the positive and negative regions. Proper curvature will produce positive and negative pressure of equal amplitude relative to the exhaust pressure base line. In this case if the total pressure difference between maximum positive and maximum negative can be taken as the effective pressure output, then it can be said that the valve is capable of 100% pressure recovery. For example, with an inlet pressure of 0.5 p.s.i., pressures of plus 0.25 p.s.i. and minus 0.25 p.s.i. can be obtained in the cycling action for a total differential of 0.5 p.s.i. which is equal to the elevation of inlet pressure above the exhaust pressure.

Time pressure characteristic 13c in FIGURE 4 illustrates the extreme nozzle divergence on the capacitance side in FIGURE 3 whereby a continuous and well defined flow-pressure cycle can be produced. In this case most of the capacitance is in the negative phase with only a brief entry into the positive region. If this divergence at wall 13 is made more abrupt, biasing action because of differences between walls 13 and 14 will disappear along with the ability to transfer input energy in sufficient quantity to do work in a capacitance system. This does not mean that a symmetrical or abrupt nozzle divergence at both walls 13 and 14 would not produce a cycling or oscillation of the power stream if one branch is made a capacitance, but the pressure fluctuations would be small relative to the input pressure.

In fact, this exact form of low pressure recovery oscillation occurs in some of the many types of toy and police whistles wherein a power stream blown into a nozzle section oscillates between a capacitance cavity and exhaust environment separated by a dividing member. In a whistle the capacitance biasing action is intermittent and occurs only when negative pressure is generated in the capacitance branch by entrainment action of the power stream. In the present valve, biasing is continuous and the direct result of structural dissimilarities at the nozzle which produces well defined, gross pressure cycles in the capacitance branch.

As distinguished from a whistle, this invention deals only with a cycling valve acting as a fluid pressure and flow inverter which is operated in conjunction with a variety of capacitance systems. To illustrate the usefulness of this invention, its application to several typical capacitance systems is shown in FIGURES 5, 6, 7 and 8.

FIGURE 5 shows the primary embodiment in its use as an emergency respirator. In this case the cycling valve 4, shown diagrammatically, is connected to the man's lungs through a face mask 26. Since the lungs are resilient they act as the capacitance element of the system and also it is their very nature to receive and return fluid flow and pressure in a cycling manner. For this system the simple construction, always open passageways, and high pressure recovery are of special value. Simple construction provides the necessary reliability and operational ease so necessary in emergency applications. The always open passageways provide avenues for excess flow capacity and convenient cleaning and inspection.

A high pressure recovery simplifies requirements placed on the fluid supply source since the range of pressures for respiratory assistance is near the top of that supplied by simple blowers. If losses through the cycling valve are too great, one is forced into high pressure compressors or cylinder gases with their attendant gages, valves, regulators, and increased power. The always open passages also permits further blower simplification in that it can be made a positive displacement type without danger of sudden surges of load and pressure as would occur with opening and closing of a valve poppet.

When an adult respirator is used on a child or infant, it cycles faster, as is desirable, because of the reduced volume of the capacitance. The system will tolerate normal leakage in the face mask but excessive leakage will slow or stop the cycling action, thus making the fault known to the operator.

Optimum pressure patterns for respirators will be found somewhere between conditions of 13a and 13b of FIGURES 3 and 4. A slight negative pressure is desired as an assurance of normal exhalation to ambient pressure and a minimal influence of lung pressure on blood circulation in the chest cavity. In addition to use of the respirator on humans, there is a need for respirators scaled down to animal sizes for use in medical research. The present valve is especially adapted to fabrication in various sizes both large and small. The nozzle and divergence patterns with their corresponding performance characteristics can be scaled in direct proportions. The passageway pattern without small control jets and feed back loops common to many pure fluid devices simplifies fabrication and provides reliable operation in the smallest sizes.

FIGURE 6 illustrates a rigid volume capacitance shown as a liquid storage tank in a zero gravity environment. Under zero gravity, measurement of liquid contents of a tank is made difficult by lack of any level reference. In this application of the invention, compliance or compressibility of the gas space in the tank becomes the pressure-flow absorbing and release capacitance cycled by the cycling valve. Since compliance will change with relative volumes of compressible gas and non-compressible liquid in the tank, the cycling valve will respond by cycling faster on a full tank than on an empty tank and a meter to measure the cycling frequency will provide a direct measure of tank contents regardless of the shape the liquid might assume when weightless.

FIGURE 7 shows the cycling valve used as an inverter in one function of the electronic versus fluid control analogy. The particular component using the cycling valve (inverter) is analogous to a step-up transformer and is indicated by numeral 28. Pressure and flow versus time wave forms are shown for each stage of the system. The transformer is represented by a large flexible diaphragm 29 mechanically connected directly to a small diaphragm 30.

By application of Pascal's principle common to hydraulic press technology, it is readily apparent that a low pressure large flow pulse on the large diaphragm can produce a high pressure small flow pulse on the small diaphragm. The latter pulse is transmitted through a tube 31 to a receiving instrument or device 35 and the pulsing medium in this part of the system may be either gas or liquid. In this case the large diaphragm chamber is also the capacitance element C in that it absorbs and releases the required pressure and flow for the cycling valve 4. Obviously, additional capacitance could be added to the connecting line along with any combination of flow resistances, fluid diodes, etc., to modify cycling rates and pressure-flow patterns as desired.

Curves $P_p$ and $P_f$ illustrate the steady pressure and flow characteristics of the fluid source P. Curves $21_p$ and $21_f$ illustrate the pulsing pressure and flow characteristics in capacitance connection 21 on the primary side of the transformer and curves $31_p$ and $31_f$ illustrate the pressure and flow pulses in tube 31 on the secondary side.

FIGURE 8 shows the cycling valve 4 used to deliver a mechanical output with the added function of a simple, remote, stop and start control. In this application a piston and cylindner 41 is used as the capacitance C and a wheel and ratchet assembly 42 is used to convert reciprocal cycling of the piston to unidirectional output shaft rotation. Ordinarily, as long as fluid pressure and flow enter the cycling valve inlet, cycling would be continuous but if a leak of sufficient magnitude to prevent maximum cycle pressure is introduced into the capacitance system, cycling action will stop.

If this leak vents through an exposed port 43 that can be opened and closed by an operator's finger, then the simple action of touch and release from this port will start and stop the output shaft. Shaft rotation would continue as long as the control port 43 remains closed. The magnitude of leak required will depend on the pressure-flow pattern set by nozzle divergence details. An added feature of piston return can be produced by arranging a negative pressure phase in the pattern, as explained in connection with pressure curve 13b in FIGURE 4, thereby eliminating the need for a return spring.

Still other useful applications of the cycling valve will occur to persons skilled in the art, the present examples being deemed sufficient to illustrate the principles of the invention.

It is to be emphasized that in the present inverter system the valve is a "no gain" device as distinguished from fluid amplifiers where a weak input signal is amplified to produce a stronger output signal. There are no control jets whatever. The only functional source of fluid for the valve is a single steady flow input. In combination with a capacitance, the valve functions as an inverter to change the steady flow input into a pulsating alternating flow output. Except for losses, the output contains the same energy as the input.

The output may be utilized directly in different ways as illustrated in FIGURES 5 and 8. The output may be used to energize the primary side of a transformer as in FIGURE 7. The output frequency may be utilized to measure capacitance as in FIGURE 6.

Having now described my invention and in what manner the same may be used, what I claim as new and desire to protect by Letters Patent is:

1. A valve for alternately and cyclically filling and dumping a capacitance, said valve comprising an inlet nozzle, first and second outlets, a flow divider in front of said nozzle, each of said outlets comprising a diverging walled passageway on opposite sides of said divider, the outside wall in said first outlet having a hiatus free continuous curved divergence from said nozzle to exert a strong boundary layer lock-on of the stream of said nozzle and biasing the stream into said first outlet, and the outside wall in the second passageway having an offset divergence from said nozzle to exert a weaker boundary layer lock-on of said stream, said first outlet being a capacitance supplying passageway and constituting the only functional connection between the valve and said capacitance and said second outlet being an exhaust outlet, said pair of outlets constituting the only functional passageways for fluid flow beyond said inlet nozzle constituting the only functional source of fluid to the valve, flow through said first outlet cyclically reversing direction to alternately fill and dump said capacitance.

2. The valve of claim 1 including a capacitance comprising a mask for the patient, connected to said outlet, said mask serving as inlet and outlet for utilizing the lungs of a patient as said capacitance.

3. The valve of claim 1 including a capacitance tank containing a material to be measured and a frequency meter in the line connecting said first outlet with said tank.

4. The valve of claim 1 including a capacitance comprising an expansible chamber having a movable wall for producing mechanical movement.

5. The device of claim 4 including a second expansible chamber having its own movable wall mechanically connected to the movable wall of said first chamber; and a fluid conduit connected with said second expansible chamber.

6. The device of claim 4 including a vent in the connection between said capacitance and said first outlet and means to open and close said vent to control said mechanical movement.

7. The valve of claim 1, including a capacitance comprising a chamber, said valve and chamber forming a system for to and fro circulation of fluid in said chamber.

8. The valve of claim 7, the frequency of said cyclically reversing flow being inversely proportional to the volume of said chamber which is available to said fluid.

9. The valve of claim 8, including a frequency measuring device connected with said system.

References Cited

UNITED STATES PATENTS

| | | | |
|---|---|---|---|
| 2,877,766 | 3/1959 | Moore | 128—203 |
| 3,034,628 | 5/1962 | Wadey | 137—81.5 |
| 3,124,999 | 3/1964 | Woodward | 137—81.5 XR |
| 3,277,914 | 10/1966 | Manion | 137—81.5 |
| 3,311,122 | 3/1967 | Gottron | 137—81.5 |
| 3,313,313 | 4/1967 | Katz | 137—81.5 |
| 3,368,555 | 2/1968 | Beasley | 137—81.5 XR |
| 3,373,600 | 3/1968 | Taplin | 137—81.5 XR |
| 3,267,949 | 8/1966 | Adams | 137—81.5 |

FOREIGN PATENTS 1,278,782  11/1961  France.

SAMUEL SCOTT, Primary Examiner

U.S. Cl. X.R.

137—81.5

PO-1050
(5/69)

UNITED STATES PATENT OFFICE
CERTIFICATE OF CORRECTION

Patent No. 3,472,225          Dated October 14, 1969

Inventor(s) Henry L. Burns

It is certified that error appears in the above-identified patent and that said Letters Patent are hereby corrected as shown below:

Column 1, line 3, for "Beaverton, Wash.," read -- Beaverton, Oregon --.

Column 1, line 37, for "bow" read -- flow --.

Column 8, line 3, after "inlet nozzle" insert: -- , and said inlet nozzle --.

Signed and sealed this 4th day of May 1971.

(SEAL)
Attest:

EDWARD M. FLETCHER, JR.          WILLIAM E. SCHUYLER, JR.
Attesting Officer                Commissioner of Patents